(12) United States Patent
Malek et al.

(10) Patent No.: US 10,576,833 B2
(45) Date of Patent: Mar. 3, 2020

(54) VEHICLE CHARGER POSITIONING METHOD AND CHARGER ASSEMBLY

(71) Applicant: Ford Global Technologies, LLC, Dearborn, MI (US)

(72) Inventors: Hadi Malek, Dearborn, MI (US); Daniel Boston, Dearborn, MI (US); Jacob Mathews, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 15/276,098

(22) Filed: Sep. 26, 2016

(65) Prior Publication Data

US 2018/0086219 A1    Mar. 29, 2018

(51) Int. Cl.
*B60L 53/35*    (2019.01)
*B60L 53/60*    (2019.01)
(Continued)

(52) U.S. Cl.
CPC .......... *B60L 11/1827* (2013.01); *B60L 53/16* (2019.02); *B60L 53/305* (2019.02); *B60L 53/35* (2019.02);
(Continued)

(58) Field of Classification Search
CPC .. B60L 11/1827; B60L 11/1818; B60L 53/35; B60L 53/16; B60L 53/60; B60L 53/305; B60L 53/37; H02J 50/80; H02J 7/0045; H02J 7/0021; H02J 2007/0096; H91J 7/0021; Y02T 90/125; Y02T 90/163; Y02T 10/7005; Y02T 90/128; Y02T 10/7088; Y02T 90/14; Y02T 90/121
See application file for complete search history.

(56) References Cited

U.S. PATENT DOCUMENTS

| | | | | |
|---|---|---|---|---|
| 5,556,284 A | * | 9/1996 | Itou | ..................... B60L 11/1818 180/65.1 |
| 7,999,506 B1 | * | 8/2011 | Hollar | ................. B60L 11/1818 320/104 |

(Continued)

FOREIGN PATENT DOCUMENTS

JP            09322412         12/1997

OTHER PUBLICATIONS

Qualcomm Becomes First Company to Enable Wireless Charging for Mobile Devices with Metal Cases, Press Release, Jul. 28, 2015, San Diego, California, retrieved on Aug. 18, 2016 from https://www.qualcomm.com/news/releases/2015/07/28/qualcommbecomes firstcompanyenablewirelesschargingmobiledevices.

(Continued)

*Primary Examiner* — Stacy Whitmore
(74) *Attorney, Agent, or Firm* — David Kelley; Carlson, Gaskey & Olds, P.C.

(57) ABSTRACT

An exemplary charger positioning method includes, among other things, positioning a charging plug of a conductive charger relative to a charge port of a vehicle based on a wireless transmission between the conductive charger and the vehicle. An exemplary charger assembly includes a transmitter system associated with one of a vehicle or a conductive charger, a receiver system associated with the other of the vehicle or the conductive charger, and an actuator that moves a charging plug of the conductive charger to a charging position in response to a transmission from the transmitter system.

19 Claims, 4 Drawing Sheets

(51) Int. Cl.
*B60L 53/30* (2019.01)
*H02J 7/00* (2006.01)
*H02J 50/80* (2016.01)
*B60L 53/37* (2019.01)
*B60L 11/18* (2006.01)
*B60L 53/16* (2019.01)

(52) U.S. Cl.
CPC ............ *B60L 53/60* (2019.02); *H02J 7/0021* (2013.01); *H02J 7/0045* (2013.01); *H02J 50/80* (2016.02); *H02J 2007/0096* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | | | |
|---|---|---|---|---|
| 8,718,856 | B2* | 5/2014 | Leary | B60L 11/1824 320/104 |
| 9,112,364 | B2* | 8/2015 | Partovi | H02J 7/025 |
| 9,707,853 | B2* | 7/2017 | Boyer | B60L 11/182 |
| 9,873,347 | B2* | 1/2018 | Brown | B60L 11/1833 |
| 2005/0194926 | A1 | 9/2005 | Di Stefano | |
| 2010/0201309 | A1* | 8/2010 | Meek | B60L 11/1816 320/108 |
| 2010/0235006 | A1* | 9/2010 | Brown | B60L 11/182 700/286 |
| 2011/0077809 | A1* | 3/2011 | Leary | B60L 11/1824 701/22 |
| 2011/0204845 | A1 | 8/2011 | Paparo et al. | |
| 2011/0221387 | A1* | 9/2011 | Steigerwald | B60L 11/182 320/108 |
| 2012/0001330 | A1 | 1/2012 | Prosser et al. | |
| 2013/0265007 | A1* | 10/2013 | Leary | B60L 11/1824 320/109 |
| 2014/0028255 | A1 | 1/2014 | Brimacombe | |
| 2014/0239890 | A1 | 8/2014 | Patwardhan | |
| 2015/0073642 | A1* | 3/2015 | Widmer | G01C 21/36 701/22 |
| 2015/0204928 | A1* | 7/2015 | Hoover | H02J 7/025 320/108 |
| 2016/0023565 | A1 | 1/2016 | Bell et al. | |
| 2016/0144735 | A1* | 5/2016 | Haddad | B60L 11/1827 320/109 |
| 2016/0264010 | A1* | 9/2016 | Boyer | B60L 11/182 |
| 2017/0101024 | A1* | 4/2017 | Halker | B60L 11/1827 |
| 2017/0259678 | A1* | 9/2017 | Cao | B60L 11/1827 |

OTHER PUBLICATIONS

Casey, Henry T., WiTricity Shows Off Fast, Easy Wireless Charging, Tom's Guide, Jan. 8, 2016, retrieved on Aug. 18, 2016 from http://www.tomsguide.com/us/witricitywirelesscharging,news22085.html 3.

ConnectMyEV, About, retrieved on Aug. 18, 2016 from http://www.connectmyev.com/#!about/c1c32.

Sorokanich, Bob, Tesla's Solid Metal Snake Charger Is Now Terrifyingly Real, Aug. 6, 2015, retrieved on Aug. 18, 2016 from http://www.roadandtrack.com/newcars/cartechnology/news/a26293/teslasolidmetalsnakecharger/.

* cited by examiner

VEHICLE CHARGER POSITIONING METHOD AND CHARGER ASSEMBLY

TECHNICAL FIELD

This disclosure relates to positioning a charging plug in a charging position to couple a conductive charger to a charge port of an electrified vehicle.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A powertrain of an electrified vehicle is typically equipped with a battery pack having battery cells that store electric power for powering the electric machines. The battery cells may be recharged during a drive via regenerative braking or via the internal combustion engine. Some electrified vehicles, such as PHEVs, engage a charger to transmit electric power from a grid source to the battery cells.

SUMMARY

An exemplary charger positioning method includes, among other things, positioning a charging plug of a conductive charger relative to a charge port of a vehicle based on a wireless transmission between the conductive charger and the vehicle.

In another example of the foregoing method, the wireless transmission emanates from the vehicle and is received by the conductive charger.

In another example of any of the foregoing methods, the wireless transmission is generated by a coil, and the method comprises charging the vehicle after the positioning without using the coil.

Another example of any of the foregoing methods includes the positioning as an automatic positioning.

Another example of any of the foregoing methods includes positioning based further on infrared recognition.

Another example of any of the foregoing methods includes positioning based further on ultrasonic recognition.

Another example of any of the foregoing methods includes positioning based further on optical recognition.

Another example of any of the foregoing methods includes receiving a portion of the charging plug or the charge port within the other of the charging plug or the charge port during the positioning, and conductively charging the vehicle through the charge port.

In another example of any of the foregoing methods, the wireless transmission is a magnetic field.

A charger assembly according to another exemplary aspect of the present disclosure includes, among other things, a transmitter system associated with one of a vehicle or a conductive charger, a receiver system associated with the other of the vehicle or the conductive charger, and an actuator that moves a charging plug of the conductive charger to a charging position in response to a transmission from the transmitter system.

In another example of the foregoing charger assembly, the charging plug is physically coupled to a charge port of the vehicle when in the charging position.

In another example of the foregoing charger assembly, the transmitter system comprises a first coil, and the receiver system comprises a second coil.

In another example of the foregoing charger assembly, the transmission is a magnetic field.

In another example of the foregoing charger assembly, the transmitter system is mounted to the vehicle, and the receiver system is mounted to the conductive charger.

In another example of the foregoing charger assembly, the receiver system is mounted to the charging plug.

Another example of the foregoing charger assembly includes an infrared transmitter and an infrared detector. The actuator moves the charging plug to the charging position additionally in response to an infrared signal.

Another example of the foregoing charger assembly includes an ultrasonic transmitter and an ultrasonic detector. The actuator moves the charging plug to the charging position additionally in response to an ultrasonic signal.

Another example of the foregoing charger assembly includes an optical transmitter and an optical detector. The actuator moves the charging plug to the charging position additionally in response to an optical signal.

Another example of the foregoing charger assembly include the transmitter system comprising at least three individual transmitters.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
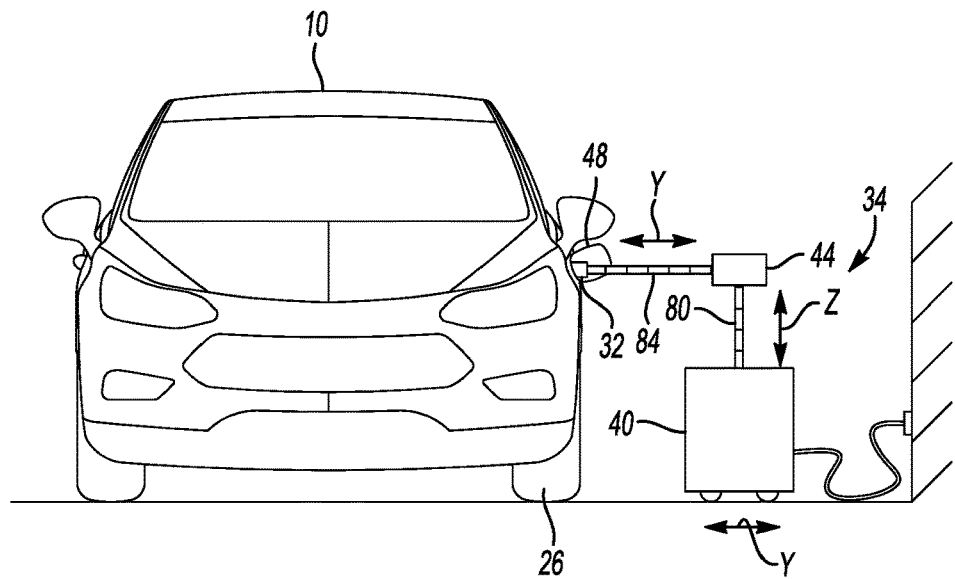
FIG. 1 illustrates a front view of an electrified vehicle and an example charger assembly in a charging position.
Figure 3:
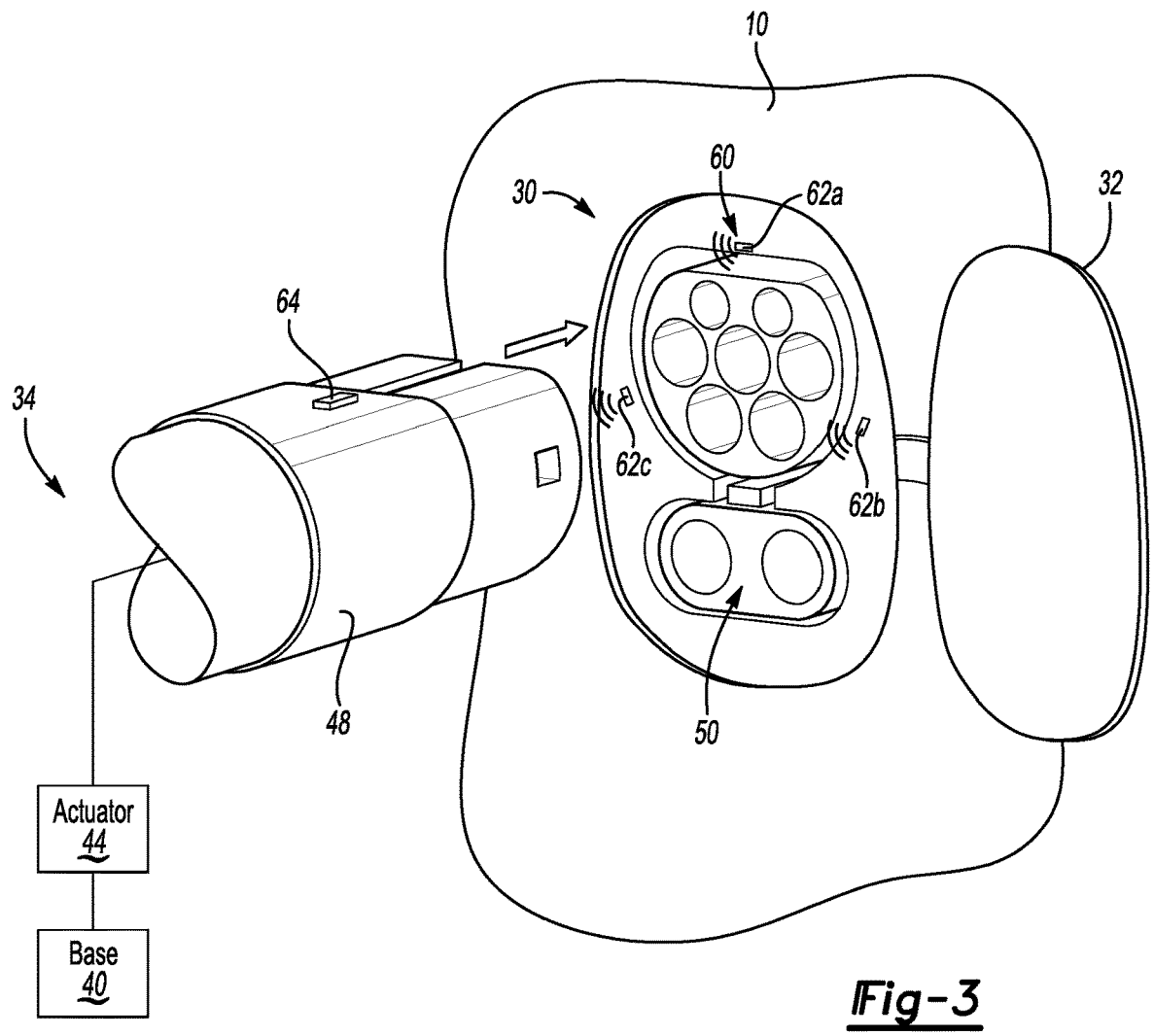
FIG. 3 illustrates a close-up perspective and partially schematic view of the charger assembly and a charge port of the electrified vehicle in the non-charging position of FIG. 2.
Figure 2:
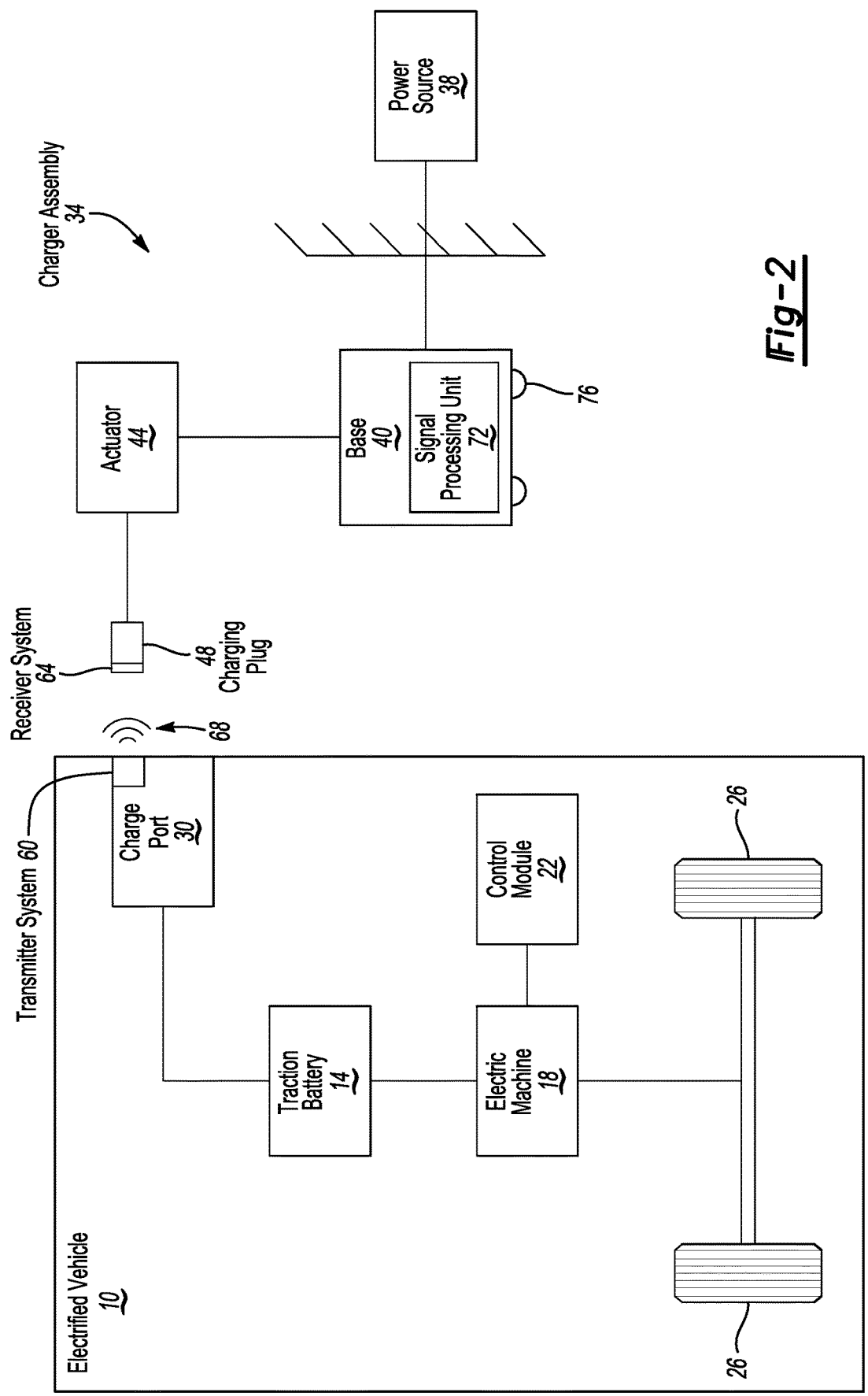
FIG. 2 illustrates a partially schematic view of the electrified vehicle and the conductive charger assembly of FIG. 1 in a non-charging position.

This disclosure relates to a charger assembly used to charge an electrified vehicle. The charger assembly can move automatically to a charging position where a charging plug is engaged with a charge port of the electrified vehicle in a charging position. The charger assembly can conductively charge the vehicle when the charging plug is in the charging position.

Referring to FIGS. 1 to 5, an example electrified vehicle 10 includes a traction battery 14, an electric machine 18, a control module 22, at least two drive wheels 26, a charge port 30, and a charge port door 32. The electric machine 18 can receive electric power from the traction battery 14. The electric machine 18 converts the electric power to torque to drive the wheels 26. The traction battery 14 is a relatively high-voltage traction battery.

The vehicle 10 is an all-electric vehicle. In other examples, the electrified vehicle is a plug-in hybrid electric vehicle, which selectively drives wheels using torque provided by an internal combustion engine instead of, or in addition to, the electric machine 18.

The electrified vehicle 10 is shown parked near a charger assembly 34 that can be used to charge the traction battery 14 with power from a power source 38, which is a grid power source in this example. In another example, the charger assembly 34 charges the traction battery using power supplied by a battery bank. This disclosure is not limited to the electrified vehicle 10. That is, the teachings of this disclosure could apply to, among other things, any vehicle that connects to a charger assembly to charge a battery.

In an exemplary embodiment, the charger assembly 34 includes a base 40, an actuator 44, and a charging plug 48. The charger assembly 34 is a conductive charger in this example. Conductive chargers can require some physical connection, such as a conductor coupling devices together. Conductive charging is not considered a wireless power transfer due to the conductor.

An inductive charger, in contrast to conductive chargers, does not require a direct physical coupling between a charging plug and a charging port to transfer energy. Instead, an electromagnetic field is used to transfer energy from to the electrified vehicle. Inductive chargers are oftentimes considered wireless chargers. Inductive charging is considered a wireless power transfer.

Figure 5:
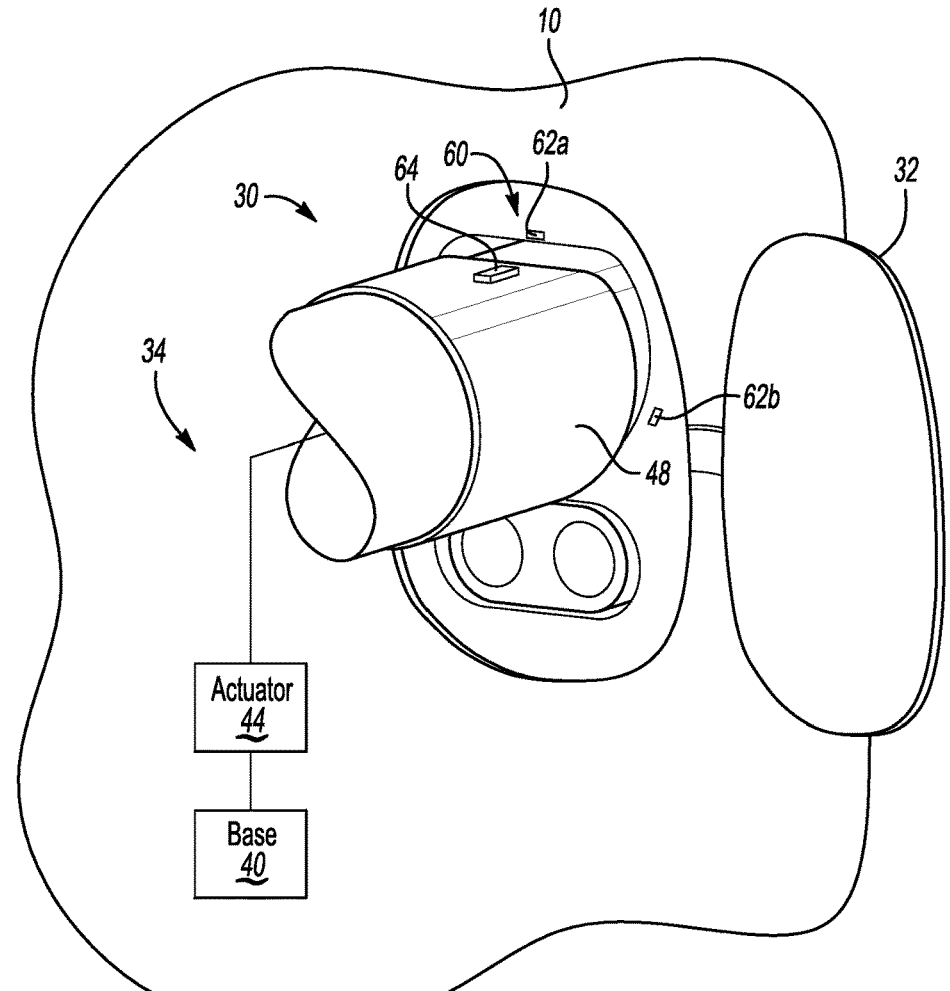
FIG. 5 illustrates the portions of the charge port and portions of the charger assembly of FIG. 4 in a charging position.

During a charge, the charging plug 48 is automatically moved from a non-charging position to the charging position of FIGS. 1 and 5. In the charging position, the charging plug 48 is directly coupled to the charge port 30 of the electrified vehicle 10. The charge port door 32 is opened to permit the charging plug 48 to engage the charge port 30 in the charging position.

When the charging plug 48 of the charger assembly 34 is in the charging position, electric energy can move from the power source 38 through the charger assembly 34 to the electrified vehicle 10. The charge, in this example, is an AC charge using power from AC source. In another example, the charge is a DC charge where a charger couples to a DC interface 50 of the charge port 30.

In FIG. 1, the charger assembly 34 is shown with the charging plug in the charging position where the charging plug 48 is directly coupled to the charge port 30 of the electrified vehicle 10. Notably, the charger assembly 34 can move the charging plug 48 from the non-charging position of FIG. 2 to the charging position of FIG. 1 automatically. The charger assembly 34 is thus considered a hands-free charger assembly.

The charger assembly 34 includes a charge port location system to determine what movements are necessary to move the charging plug 48 to the charging position. The charge port location system includes, among other things, a transmitter system 60 associated with the electrified vehicle 10, and a receiver system 64 associated with the charging plug 48.

The transmitter system 60 comprises a coil that generates a magnetic field 68. The receiver system 64 detects the magnetic field emanating from the transmitter system 60. The magnetic field detected by the receiver system 64 is communicated to a signal processing unit 72 of the charger assembly 34.

In a non-limiting embodiment, the transmitter system 60 is on the electrified vehicle 10 and the receiver system 64 is on the charging plug 48. The exemplary transmitter system 60 includes three individual transmitters 62a, 62,b, 62c distributed about the charge port 30. Using the three transmitters 62a, 62,b, 62c facilitates the charge port location system triangulating on the location of the charge port 30 when the charge plug 48 is moved to the charging position.

In another example, the receiver system 64 includes three or more separate receivers distributed about the charging plug 48 to facilitate triangulation, and less than three transmitters within the transmitter system 60 on the electrified vehicle 10. The receiver system 64 could be a ring-type sensor distributed around the charge plug 48, a charge cable associated with the charge plug 48, or both.

In yet another example, a receiver system is on the electrified vehicle 10 and a transmitter system is on the charging plug 48. The receiver system on the electrified vehicle 10 could include three or more separate receivers to facilitate triangulation, and the transmitter system on the charging plug 48 could include less than three individual transmitters. Alternatively, the transmitter system on the charging plug 48 could include three or more separate transmitters to facilitate triangulation, and the receiver system on the electrified vehicle 10 could include less than three receivers.

The actuator 44, the base 40, or both move the receiver system 64 and the charging plug 48 relative to the transmitter system 60. Moving the receiver system 64 relative to the transmitter system 60 changes the intensity of the magnetic field communicated to the signal processing unit 72. The charger assembly 34 positions the charging plug 48 relative to the charge port 30 based on the intensity of the magnetic field. The charger assembly charger assembly 34 can, for example, position the charging plug 48 relative to the charge port 30 by moving the charging plug 48 to a position corresponding to the maximum detected magnetic field at a given frequency.

The signal processing unit 72 receives an input from the receiver system 64 corresponding to the magnetic field detected by the receiver system 64 at a position of the receiver system 64. The input may be a current measurement that is based on the magnetic field detected by the receiver system 64. The signal processing unit 72 interprets increases in an observed current as the receiver system 64 moving closer to the transmitter system 60.

The signal processing unit 72 can utilize a control algorithm to find the maximum detected magnetic field, and thus the position of the transmitter system 60 about the charge port 50. Exemplary control algorithms suitable for locating a maximum of the detected magnetic field include, but are not limited to, Perturb and Observe (P&O), and Extremum Seeking Control (ESC). Notably, the ESC will not become trapped in local maximums and will look for the global maximum power point.

In an exemplary non-limiting embodiment, the transmitters 62a, 62b, 62c are each relatively planar, thin coils that generate and transmit relatively low power magnetic fields. The magnetic fields generated and transmitted by the transmitters 62a, 62b, 62c is a non-radiative energy transfer and can be well below 100 kHz.

In an exemplary non-limiting embodiment, the transmitters 62a, 62b, 62c are configured such that the transmitters 62a, 62b, 62c each have a quality factor or "Q" that is greater than or equal to ten. For purposes of this embodiment, Q can be calculated using Equation 1 below:

$$Q = \frac{2 \times \pi \times F \times L}{R} \quad \text{Equation 1}$$

In Equation 1, L represents inductance, R represents resistance, and F represents and operating frequency of the coil within the respective one of the transmitters 62a, 62b, 62c. Selecting and configuring the transmitters 62a, 62b, 62c to have a Q greater than or equal to ten can provide a magnetic field suitable for detection by the receiver system 64. Increasing the Q can extend a range where the receiver system 64 can detect the magnetic field from the transmitter system 60.

The exemplary transmitters 62a, 62b, 62c could be a rectangular or square coils that are less than 12.7 millimeters by 12.7 millimeters. Coils used in connection with inductive charges can, in contrast to the coils of the transmitters 62a, 62b, 62c, can be 160 millimeters by 160 millimeters or larger. The magnetic field generated and transmitted by the transmitter system 60 has an intensity that is substantially less than magnetic fields generated by coils used in inductive charges.

Because the intensity of the magnetic field generated and transmitted by the transmitter system 60 is substantially less than the intensity of magnetic fields generated by coils used in inductive charges, the magnetic field of the transmitter system 60 is less likely to interfere with, for example, medical equipment or other devices than magnetic fields from coils used in connection with inductive charging.

The coils of the transmitters 62a, 62b, 62c could be air cooled. In some examples, the coils are each ferrite or metal backed. In other examples, the coils of the transmitters 62a, 62b, 62c includes no ferrite or metal backing.

The exemplary transmitters 62a, 62b, 62c can be enclosed in a non-metallic, ultra-violet protected enclosure to block water, dust, and other potential contaminants from reaching the transmitters 62a, 62b, 62c.

The transmitter system 60 can be an aftermarket assembly that is secured to the electrified vehicle 10 using an adhesive. In such an example, the transmitter system 60 could be battery powered. In other examples, the transmitter system 60 draws power from a power source of the electrified vehicle 10, such as the traction battery 14 or an accessory battery.

The magnetic field from each of the transmitters 62a, 62b, 62c could include an encoded signal, an encrypted signal, or both that the signal processing unit 72 utilizes to associate a signal to a particular one of the plurality of individual transmitters 62a, 62b, 62c. The plurality of individual transmitters 62a, 62b, 62c could be positioned in a particular pattern. The pattern is instructive to the signal processing unit 72 and the signal processing unit 72 commands the charging plug 48 to move, in part, based on the pattern.

The magnetic field from the transmitter system 60 could include an encoded signal, an encrypted signal, or both that contains a vehicle identifier. The signal processing unit 72 could utilize the vehicle identifier when determining where to position the charging plug 48. For example, the signal processing unit 72 may command the charging plug 48 to move to a position that is offset from a location of the transmitter system 60. The offset is determined based on the vehicle identifier. Again, the location of the transmitter system 60 can be calculated based on the peak intensity of the magnetic field from the transmitter system 60.

The charger assembly 34 could be networked to receive updates on new vehicle models or port configurations. The signal processing unit 72 could retrieve this updated information as needed to permit the signal processing unit 72 to understand new encoded signals from the transmitter system 60, newly released transmitter systems 60, or transmitter systems 60 having transmitters 62a, 62b, 62c positioned in new locations.

The magnetic field from transmitter system 60 can travel through obstacles. Thus, the receiver system 64 can detect the location of the transmitter system 60 even if the transmitter system 60 and receiver system 64 are on opposite sides of the electrified vehicle 10.

Referring to the charger assembly 34, the base 40 can move in response to commands from the signal processing unit 72. In this example, the base 40 includes wheels 76 that can rotate to change the position of the base 40 relative to the electrified vehicle 10. In an exemplary non-limiting embodiment, the base 40 can be moved to reposition the charging plug 48 along a Y-axis shown in FIG. 1, as well as along an X-axis, which extends out of the page in FIG. 1.

The actuator 44 can move the charging plug 48 in response to commands from the signal processing unit 72. The actuator 44, in an exemplary non-limiting embodiment, could include a first arm 80 that extends and retracts to position the charging plug 48 along a Z-axis shown in FIG. 1, and a second arm 84 that extends and retracts to position the charging plug 48 along the Y-axis.

In some examples, a location of the charging plug 48 is adjusted first by positioning the base 40 relative to the charge port 30. The location of the charging plug 48 is then fine-tuned with more precise adjustments using the actuator 44 with the first arm 80 and the second arm 84.

The actuator 44 could include mechanical actuators, such as motors that operate to extend and retract the first arm 80 and the second arm 84. The actuator 44 could have a rack and pinion structure to permit precisely position the charging plug 48. A person having skill in this art and the benefit of this disclosure could select an actuator suitable for moving the charging plug in a particular location in response to one or more commands from the signal processing unit 72.

Figure 4:
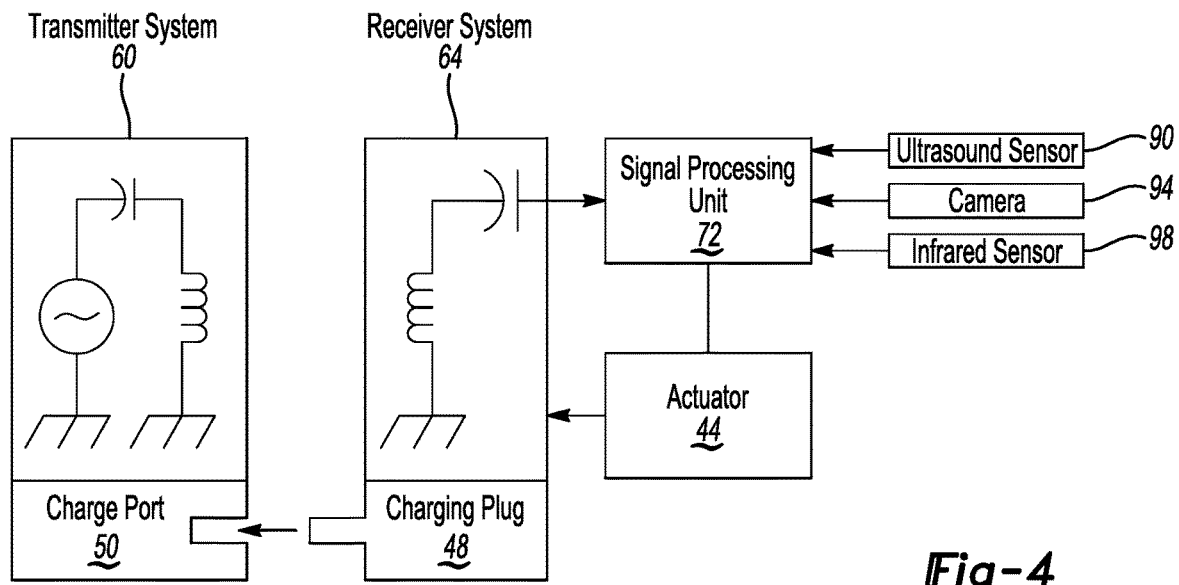
FIG. 4 illustrates a highly-schematic view of selected portions of the charge port and selected portions of the charger assembly in the non-charging position of FIG. 2.

With specific reference to FIG. 4, the single processing unit 72 can utilize inputs from sources other than the receiver system 64 to assist in moving the charging plug 48 to the charging position. In this example, the other sources include an input from an ultrasonic sensor 90, a camera 94, an infrared sensor 98, or some combination of these.

The ultrasonic sensor 90, for example, can generate high-frequency sound waves and evaluate an echo received in response. The echo could be used by the signal processing unit 72 to verify that the charging plug 48 is in the charging position. The echo could be used to detect distance between the vehicle 10 and the charger assembly 34.

The camera 94, for example, can take pictures of the electrified vehicle 10 to verify that the charger assembly 34 is on a correct side of the electrified vehicle 10. If the signal processing unit 72 does not recognize the charge port 30 in the pictures, the signal processing unit 72 can command the charger assembly 34 to move to an opposite side of the electrified vehicle 10.

The infrared sensor 98, for example, can generate an infrared beam toward the electrified vehicle 10. The infrared sensor 98 can receive a reflection of the beam or recognize and interruption in the beam. In response to the reflection of the beam or the interruption, the signal processing unit 72 can reposition, or refine the position of, the charging plug 48 relative to the charge port 30.

Figure 6:
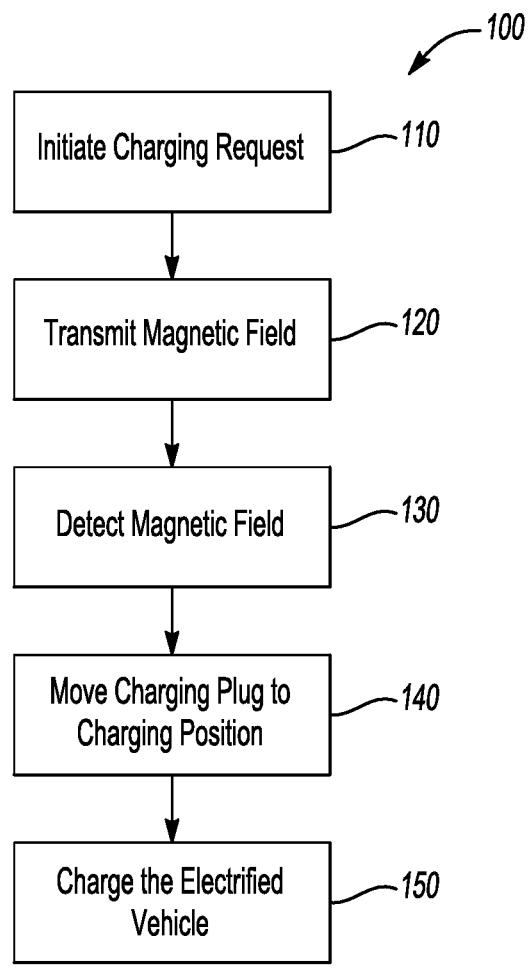
FIG. 6 illustrates a flow of an example method for charging the electrified vehicle of FIG. 1 using the charger assembly.

Referring to FIG. 6 with continuing reference to FIGS. 1 to 5, an exemplary method 100 of engaging the charging plug 48 includes a step 110 of initiating a charging request. A user could, for example, initiate the charging request at the end of a drive cycle when the electrified vehicle 10 is parked in a garage near the charger assembly 34.

Initiating the request could include the user interacting with a touch screen display or button within a cabin of the electrified vehicle 10. The user could initiate the request from outside the electrified vehicle 10, such as by interfacing with a charging program on a smart phone or computer.

In some examples, the request initiates automatically in response to the electrified vehicle 10 moving to a position near the charger assembly 34. The positioning of the electrified vehicle 10 could be determined utilizing global positioning coordinates, or based on a proximity sensor associated with the charger assembly 34 or the garage.

Initiating the request could utilize a Wi-Fi, Zigbee or Bluetooth signals, or optical recognition (e.g., QR code). In other examples, initiating the request could rely on other communication methods, such as radio-frequency identification, near field communication, or dedicated short range communications.

After the charging request is initiated at the step 110, the control module commands the charge port door 32 open. An actuator, for example, could be used to open the charge port door 32. Alternatively, the act of opening the charger door by the driver could trigger a charge request from the vehicle to the signal processing unit 72 to initiate a charge event.

The method 100 then moves to a step 120 wherein the transmitter system 60 begins to transmit the magnetic field that the charger assembly 34 uses to locate the charge port 30. The receiver system 64 then, at a step 130, detects the magnetic field from the transmitter system 60.

The charger assembly 34 then moves in a direction relative to the electrified vehicle 10 at a step 140. If the signal processing unit 72 of the charger assembly 34 detects an increase in the current associated with the detected magnetic field, the charger assembly 34 continues to move in the direction. If the current decreases, the charger assembly 34 moves in another direction until the signal processing unit 72 has positioned the charging plug 48 in a position where the magnetic field is maximized.

The transmitter system 60 and the receiver system 64 are configured such that the maximum magnetic field is detected when the charging plug 48 is engages with the charge port 30 in the charging position.

In another example, the transmitter system 60 and the receiver system 64 are configured such that the maximum magnetic field is detected at a position that is offset from the charging position. In such an example, the magnetic field can include an identifier associate with the electrified vehicle 10. The signal processing unit 72 then moves the charging plug 48 to the charging position that is offset from the position of the maximum magnetic field. The offset is determined based on the identifier. The signal processing unit 72 could extract information from a database to determine what an offset should be used for a particular vehicle. The database could include information about various vehicle models that relate a position of the transmitter system for a particular vehicle model to that vehicle's charge port.

At a step 150, the method 100 begins charging the traction battery 14 of the electrified vehicle 10 using electrical energy drawn from the power source 38. The coils of the transmitter system 60 are turned off when the charging plug 48 is in the charging position and the electrified vehicle 10 is charging. In another example, the coils of the transmitter system 60 stay on during the charging.

Features of some of the disclosed examples includes a hands-free charger that does not rely on high power magnetic fields. The charger does not require specialized installations, but can be accommodated in the same way as standard electric vehicle supply equipment. The charger can be used with various charging standards, and is not type specific.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charger positioning method, comprising:
positioning a charging plug of a conductive charger relative to a charge port of a vehicle based on an intensity of a magnetic field that is transmitted from a plurality of coils distributed about the charge port or about the charging plug, the positioning including moving the charging plug from a non-charging position to a charging position, wherein the plurality of coils are noncharging coils, wherein the plurality of coils are configured to be turned on when inductive charging using the inductive charger.

2. The charger positioning method of claim 1, wherein the magnetic field emanates from the plurality of coils distributed about the charge port of the vehicle and is received by the conductive charger.

3. The charger positioning method of claim 1, wherein the method comprises charging the vehicle after the positioning without using the plurality of coils, and keeping the plurality of coils turned on during the charging.

4. The charger positioning method of claim 1, wherein the positioning is based further on infrared recognition.

5. The charger positioning method of claim 1, wherein the positioning is based further on ultrasonic recognition.

6. The charger positioning method of claim 1, wherein the positioning is based further on optical recognition.

7. The charger positioning method of claim 1, further comprising receiving a portion of the charging plug or the charge port within the other of the charging plug or the charge port when the charging plug is in the charging position, and conductively charging the vehicle through the charge port when the charging plug is in the charging position.

8. The charger positioning method of claim 1, wherein the positioning comprises automatically moving the charging plug to a position corresponding to the maximum detected magnetic field at a given frequency.

9. The charger positioning method of claim 1, wherein the magnetic field includes a vehicle identifier, and the positioning comprises positioning automatically positioning the charging plug based on an offset associated with the vehicle identifier.

10. The charger positioning method of claim 1, wherein each of the coils in the plurality of coils is configured to emit a magnetic field that is below 100 kHz.

11. The charging positioning method of claim 1, further comprising triangulating on a position of the charge port during the positioning.

12. A charger assembly, comprising:
a transmitter system associated with one of a vehicle or a conductive charger, the transmitter system including a plurality of coils distributed about a charge port of the vehicle or distributed about a charge plug of the conductive charger, wherein each of the coils in the plurality of coils is configured to emit a magnetic field having an intensity that is substantially less than an intensity of a magnetic field generated by a coil used in an inductive charge of the vehicle;

a receiver system associated with the other of the vehicle or the conductive charger; and an actuator that moves the charging plug of the conductive charger to a charging position in response to an intensity of a magnetic field, the magnetic field emanating from the plurality of coils of the transmitter system.

13. The charger assembly of claim 12, further comprising an infrared transmitter and an infrared detector, wherein the actuator moves the charging plug to the charging position additionally in response to an infrared signal.

14. The charger assembly of claim 12, further comprising an ultrasonic transmitter and an ultrasonic detector, wherein the actuator moves the charging plug to the charging position additionally in response to an ultrasonic signal.

15. The charger assembly of claim 12, further comprising an optical transmitter and an optical detector, wherein the actuator moves the charging plug to the charging position additionally in response to an optical signal.

16. The charger assembly of claim 12, wherein the transmitter system comprises at least three individual transmitters.

17. The charger assembly of claim 16, wherein each of the individual transmitters is a coil having a quality factor that is greater than or equal to ten.

18. The charger assembly of claim 12, wherein the plurality of coils are each a rectangular or square coil that is less than 12.7 millimeters by 12.7 millimeters.

19. A charger positioning method, comprising:

turning on a plurality of coils that are distributed about a conductive charge port so that the plurality of coils transmit a magnetic field, each coil within the plurality of coils a rectangular or square coil that is less than 12.7 millimeters by 12.7 millimeters, the magnetic field having an intensity that is substantially less than magnetic fields generated by coils used in inductive charges;

positioning a charging plug of a conductive charger relative to the conductive charge port of a vehicle based on an intensity of the magnetic field, the positioning including moving the charging plug from a non-charging position to a charging position; and charging the vehicle through the conductive charge port after moving the charging plug to the charging position, and keeping the plurality of coils turned on during the charging.

* * * * *